United States Patent
Ulrich et al.

(10) Patent No.: US 8,206,767 B2
(45) Date of Patent: Jun. 26, 2012

(54) REMOVAL OF ACRYLAMIDE AND/OR MELANOIDIN-FORMING CELL CONTENT

(75) Inventors: Bernhard Ulrich, Grevenbroich (DE); Reiner Haferkamp, Grevenbroich (DE); Martin Kern, Waghäusel (DE)

(73) Assignee: Intersnack Knabbergeback GmbH & Co. KG, Cologne (DE)

( * ) Notice: Subject to any disclaimer, the term of this patent is extended or adjusted under 35 U.S.C. 154(b) by 320 days.

(21) Appl. No.: 12/594,330

(22) PCT Filed: Mar. 5, 2008

(86) PCT No.: PCT/EP2008/001759
§ 371 (c)(1),
(2), (4) Date: Oct. 1, 2009

(87) PCT Pub. No.: WO2008/122333
PCT Pub. Date: Oct. 16, 2008

(65) Prior Publication Data
US 2010/0104704 A1    Apr. 29, 2010

(30) Foreign Application Priority Data
Apr. 5, 2007 (EP) .................................... 07007219

(51) Int. Cl.
*A23L 1/015* (2006.01)
(52) U.S. Cl. ......... 426/244; 426/637; 426/431; 426/481
(58) Field of Classification Search .................. 426/244, 426/637, 481, 425, 431
See application file for complete search history.

(56) References Cited

U.S. PATENT DOCUMENTS

| | | | | | |
|---|---|---|---|---|---|
| 1,225,212 | A | * | 5/1917 | Benjamin | 34/245 |
| 2,474,649 | A | * | 6/1949 | Birdseye | 426/234 |
| 2,569,075 | A | * | 9/1951 | Schade | 426/244 |
| 3,996,385 | A | * | 12/1976 | Vigerstrom | 426/244 |

(Continued)

FOREIGN PATENT DOCUMENTS
DE    1062073    9/1957
(Continued)

OTHER PUBLICATIONS

Thomas M. Amrein et al., "Influence of Thermal Processing Conditions on Acrylamide Generation and Browning in a Potato Model System" Journal of Agricultural and Food Chemistry, (2006), 54, pp. 5910-5916.

(Continued)

*Primary Examiner* — Drew E Becker
(74) *Attorney, Agent, or Firm* — J. C. Patents (57) ABSTRACT

The present invention relates to a process for removing acrylamide and/or melanoidin forming cellular ingredients from starchy plant material without enabling to remove a considerable amount of starch from the cells by washing, comprising the process steps of: providing the biological material, irreversible electroporation of the biological material, and obtaining plant material having a reduced amount of acrylamide and/or melanoidin forming cellular ingredients, the starch content of which is not enabled to be considerably reduced by washing as compared to the starting material. Furthermore, the present invention relates to plant material having a reduced of amount of acrylamide and/or melanoidin forming cellular ingredients producible by said process, to a nibble product, respectively a snack having a reduced content of acrylamide and/or melanoidins producible from said plant material, and to a device for producing the nibble product, respectively the snack comprising an electroporation reactor, a cutting equipment, optionally at least one dipping bath and a fryer or a drying device.

22 Claims, 2 Drawing Sheets

U.S. PATENT DOCUMENTS

| | | | | |
|---|---|---|---|---|
| 3,997,678 | A * | 12/1976 | Vigerstrom | 426/244 |
| 4,155,293 | A * | 5/1979 | Spiel et al. | 99/352 |
| 4,457,221 | A * | 7/1984 | Geren | 99/451 |
| 4,739,140 | A * | 4/1988 | Reznik | 219/771 |
| 6,093,432 | A * | 7/2000 | Mittal et al. | 426/237 |
| 6,773,736 | B1 * | 8/2004 | De Winter et al. | 426/244 |
| 6,821,540 | B2 * | 11/2004 | Cousin et al. | 426/237 |
| 7,691,324 | B2 * | 4/2010 | Schultheiss | 422/22 |
| 2003/0219518 | A1 | 11/2003 | Li | |
| 2004/0101607 | A1 * | 5/2004 | Zyzak et al. | 426/425 |
| 2004/0166019 | A1 * | 8/2004 | Schultheiss | 422/22 |
| 2004/0166210 | A1 * | 8/2004 | Barry et al. | 426/243 |
| 2004/0224066 | A1 | 11/2004 | Lindsay et al. | |
| 2005/0199134 | A1 * | 9/2005 | Schultheiss et al. | 99/451 |
| 2006/0106210 | A1 * | 5/2006 | Frenzel et al. | 536/124 |
| 2007/0141227 | A1 * | 6/2007 | Boudreaux et al. | 426/637 |
| 2009/0123626 | A1 * | 5/2009 | Rommens et al. | 426/549 |
| 2011/0200730 | A1 * | 8/2011 | Lewis et al. | 426/519 |

FOREIGN PATENT DOCUMENTS

| | | |
|---|---|---|
| DE | 10260983 | 7/2004 |
| DE | 102004025046 | 12/2005 |
| DE | 102004013762 | 1/2006 |
| DE | 102004028782 | 1/2006 |
| DE | 10 2005 02941 | 12/2006 |
| SU | 888921 B * | 12/1981 |

OTHER PUBLICATIONS

Adam Becalski et al., "Acrylamide in Foods: Occurrence, Sources, and Modeling" Journal of Agricultural and Food Chemistry, (2003), 51, pp. 802-808.

"Blanching: Trimming energy costs, not quality" Potato Business World, (Jul./Aug. 2003), vol. 11, Part 4, pp. 26-28.

Christian Gertz et al., "Analysis of acrylamide and mechanisms of its formation in deep-fried products" European Journal Liquid Science and Technology, (2002), vol. 104, pp. 762-771.

David V. Zyzak et al., "Acrylamide formation Mechanism in Heated Foods" Journal of Food and Agricultural Technology, (2003), 51, pp. 4782-4787.

Article Titled "High electric field pulse pretreatment: Potential for sugar beet processing" authored by Eshtiaghi M N et al., in Journal of Food Engineering, May 2002. pp. 265.-pp. 272.

Article Titled "How does sugar come from beet?", authored by Joachim Hoffmann, in Fraunhofer Gesellschaft's publication. Dec. 6, 2001, 2 pages.

Article Titled "High electric field pulse pretreatment: Potential for sugar beet processing" authored by Eshtiaghi M N et al., in Journal of Food Engineering, May 2002. p. 1.-p. 1.

* cited by examiner

Figure 1

Figure 2

REMOVAL OF ACRYLAMIDE AND/OR MELANOIDIN-FORMING CELL CONTENT

FIELD OF THE INVENTION

The present invention relates to a process/method for removing acrylamide and/or melanoidin forming cellular ingredients/substances/contents, such as for example asparagine, glucose and fructose, from starchy plant material, in particular from plant material (such as for example root tubers) from plants selected from the family of the Solanaceae, without enabling to remove thereby a considerable amount of starch from the cells by subsequent washing, as well as to plant material having a reduced amount of acrylamide and/or melanoidin forming cellular ingredients producible by said process. The invention further relates to nibble products, respectively nibble snacks, respectively potato products having a reduced amount of acrylamide and/or melanoidins producible from the above mentioned plant material, as well as to a device for producing said nibble products, respectively nibble snacks, respectively potato products.

PRIOR ART

The production of potato nibble products such as potato chips is well known in the state of the art. It is carried out by peeling, washing, and disintegrating potato tubers and finally subjecting them to a frying or drying process. As the browning of the potato products in the frying or drying process always has raised a problem, since a while also the formation of acrylamide during said process is considered as being problematic for health reasons.

The formation of acrylamide is mainly caused by the Maillard reaction when free amino acids and reducing sugars are present in the cell assembly at high temperatures, for example when frying or drying plant material, and is often accompanied by a browning of the heated material by forming melanoidins as brown colour. A specific reaction path within the Maillard reaction results in the final product acrylamide. As the main starting materials for the formation of acrylamide the amino acid asparagine and the monosaccharides glucose and fructose have been identified, which are also involved in the formation reaction of melanoidins. These substances are present in a dissolved form predominantly in intact plant cells. Their concentration depends upon many factors, such as amongst others cultivar, biological activity, ripeness, climatic and soil dependent conditions, fertilisation, time of harvest, storing atmosphere and temperature of the plants (C. Gertz, S. Klostermann, *Eur. J. Lipid Sci. Technol.* 2002, 104, 762-771; A. Becalaski et al. *J. Agric. Food Chem.* 2003, 51, 802-808; D. V. Zyzak et al. *J. Agric. Food Chem.* 2003, 51, 4782-4787; F. Escher et al. *J. Agric. Food Chem.* 2006, 54, 5910-5916).

At elevated sugar contents in potatoes, which especially occur at the end of the storage period and in harvest periods with unfavourable weather conditions, producers of potato products, in particular of chips, are often forced to use the blanching process in order to counteract a browning of the potato chips and a possible formation of acrylamide.

Due to a thermal influence (temperatures around 82° C.) blanching results in an extensive burst of cell structures so that the cell content can leak. As soon as the cells are open an exchange of cell content and the surrounding liquid medium takes place according to the rules of the diffusion. At higher concentrations of dissolved substances in the cells an exchange of substances is carried out towards the washing/blanching medium. Depending upon the blanching and washing process a leaching takes place already in the blanching device and/or in the subsequent washing steps. The effective concentration gradient mainly depends upon the selected blanching and washing process and the process parameters. The higher the concentration gradient the higher is the wash-out effect.

However, the advantages of the effective reduction of the sugar and amino acid contents by the known blanching processes are only obtainable along with substantial drawbacks.

As regards the exchange of substances the leaching is largely unspecific. This means that the cells do not only lose the interfering sugar and amino acid parts, but also other desired cellular ingredients, such as for example starch and complex material compounds, which contribute to the formation of aroma in the subsequent frying or drying.

The blanching extremely negatively affects the sensory quality of the final products. Since the cell membranes are disrupted by thermal processes, huge amounts of starch/dry substance are lost via the blanching and washing water. Said lost starch is not available for the subsequent structure formation. In addition, the starch remaining in the cells starts to gelatinise. Furthermore, the heat causes a decomposition of cell frame substances and thus an additional loosening of the cell assembly. All these negative instances result therein that for example chips made from blanched potato slices are extremely soft, elastic, sticky and insufficient in taste.

During the further processing of potatoes dry substance is lost in several process steps. One part of the losses of dry substance already takes places during peeling and cutting, since already many cells will be destroyed by the knife blades, from which subsequently starch is lost during washing. In addition, the conventional blanching process is very inefficient. As mentioned above also during the blanching a huge amount of useful plant substance is lost via the waste water. The relation of the needed amount of greenware to the amount of finished products is much higher as compared to a process without blanching. For maintaining a favourable concentration gradient a huge amount of fresh water is necessary, which has to be set to and maintained at the blanching temperatures, which in turn means a big energy input. Furthermore, at certain production locations problem with the existing sewage plants may arise due to the huge amounts of waste water loaded with starch.

A review on the usual blanching processes may be found in example in *Potato Business World* 2003, vol 11, part 4, page 26-28.

A further known process for treating plants and parts of plant, respectively, is the electroporation by means of which value giving ingredients can be released.

By electroporation intact cells are opened without nameable heating them by the action of short high voltage pulses (pulsing). The electric pulses affecting the cells expand the pores being present in the cell membranes. Up to a certain voltage potential said opening is reversible.

Said effect has been known for a long time and is used for example in the medical technology.

When the electric potential on the cell membrane exceeds a value of 10 V, the pores are opened irreversibly and the cellular liquid can exit. However, it has been attended to that effect only for some years. It is mainly used for the gentle extraction of cellular ingredients, such as for example fruit juices, sugar beet juice, secondary plant metabolites and colours. Usually the electroporation is performed in a process liquid, mostly in a water bath.

A device for the electroporation of plant process material is disclosed in DE 10 2004 025 046 A1. It comprises an energy source, which is designed to be electric bipolar and which consists of at least one bipolar high voltage pulse generator having two high voltage outlets. On these the two field forming electrode groups are connected. Several of such bipolar high voltage pulse generators in such a device are identical in construction and are provided with a trigger device for a time specified simultaneous ignition. The load circuits connected to the outlet of a high voltage pulse generator or the respective outlet of the high voltage pulse generators resemble each other as regards their complex impedance. In the case that the energy source consists of at least two high voltage pulse generators, the same are electrically decoupled from each other during the unloading by the electrolytic resistances formed by the process liquid between the partial electrodes.

DE 10 2004 013 762 B4 discloses a process for gently releasing value giving ingredients from grapes, wherein the mash obtained from the grapes is subjected to the electroporation for obtaining must, which is used for the preparation of wine. The device for performing the electroporation of the mash consists of a dielectric pipeline, the runner for the mash, in the wall of which at least two spaced electrodes for forming an electric field by pulses between them are inserted. The mash as the electrolytic load of the device has an electric resistance which is at most as high as the impedance of an high voltage pulse generator connected to the device.

DE 10 2004 028 782 A1 discloses a process and an equipment for the improved recovery and extraction of ingredients from sugar beets by electroporation.

A further process and an equipment for the improved recovery and extraction of ingredients of sugar beets by electroporation are disclosed in DE 102 60 983 A1.

DE 10 62 073 A1 discloses a process and an equipment for the improved recovery and extraction of ingredients from chicory by electroporation.

DESCRIPTION OF THE INVENTION

An object of the present invention is the provision of a non-thermal process for removing acrylamide and/or melanoidin forming cellular ingredients from starchy plant material, in particular from potato tubers, which enables to achieve a leaching comparable to a blanching process without enabling to remove a considerable amount of starch from the cells by washing and which is more economic than the blanching procedure. The loss of starch results in a loss of dry substance.

A further object of the present invention is the provision of plant material having a reduced amount of acrylamide and/or melanoidin forming cellular ingredients producible by the process according to the present invention, as well as a nibble product, respectively a snack having a reduced content of acrylamide and/or melanoidins producible from the plant material according to the present invention having a reduced amount of acrylamide and/or melanoidin forming cellular ingredients and having a better sensory quality as a nibble product, respectively a snack, respectively a potato product produced from plant material which has been subjected to a blanching procedure beforehand. In addition, it is an object of the present invention to provide a device enabling the production of the nibble product, respectively the nibble snack, respectively the potato product according to the present invention having a reduced content of acrylamide and/or melanoidins.

The problem has been solved by a process for removing acrylamide and/or melanoidin forming cellular ingredients from starchy plant material without enabling to remove a considerable amount of starch from the cells by washing, which comprises the process steps of
  providing the plant material, which is preferably washed and peeled,
  irreversible electroporation of the plant material, and
  obtaining plant material having a reduced amount of acrylamide and/or melanoidin forming cellular ingredients.

The loss of a considerable amount of starch by washing manifests in a loss of dry substance of less than 7%, when the plant material is washed after an irreversible electroporation of the plant material.

The concept underlying the present invention is the reverse usage of the electroporation effect known in the state of the art. While the extraction and recovery of cellular ingredients by destroying and discarding the matrix is known, the present invention is aimed to the removal of undesired cellular ingredients by maintaining the firm cell structure in an optimal way.

The plant material may be derived from plants of the family of the Solanaceae. Preferably it is root tubers from *Solanum tuberosum*.

The acrylamide and/or melanoidin forming cellular ingredients are for example at least one substance from the group consisting of asparagine, glucose and fructose.

According to the present invention the electroporation is [carried out] preferably in an electroporation reactor for the continuous processing of lumpy products as process goods in a process liquid with electric pulses, consisting of a circular cylindrical metallic drum having a dielectric coating or being entirely made of dielectric material, which is operable rotating about its horizontally placed cylinder axis/rotational axis at 0.1 to 4 revolutions per min, carriers made of dielectric material at the outer jacket wall of the drum, which are attached thereon uniformly over the circumference, a housing made of dielectric material surrounding with its reactor wall the drum and its carriers in a contact-free but equally spaced manner except for an open area located above the rotational axis, a degasification zone, a reaction zone in the gap between the drum and the reactor wall of the housing, as well as a feeding zone and a discharge zone through which the carriers pass, a process goods supply device which serves as product submission at a constant fill level and which autonomously feeds in the lumpy process goods by the rotational movement of the circular cylindrical drum tangentially in relation to its surface, a discharge zone designed such that a cutout in the cylindrical reactor wall, arranged below the level of the axis of rotation, causes an autonomous discharge of the process goods, the upper edge of the cutout in the cylindrical reactor wall simultaneously serves as effluent weir for the process liquid, the overflowing process liquid is separated from the now processed process goods.

Particularly preferred is at least one pair of electrodes being made of a well-electroconductive, bare lying material being inert to mechanical and chemical wear and being inserted in the lateral walls of the housing in the area of the reaction zone in the wall of dielectric material, and wherein a pulsed D.C. voltage with a negative or positive potential of up to 300 kV in unipolar mode or +150/−150 kV in bipolar mode is/are connected by connecting at least one unipolar or bipolar electric pulse generator.

Preferably the electroporation is performed in a water bath having a conductivity of 1-2 mS. Between the electrodes of the electroporation device preferably a potential difference of 50-300 kV, more preferably a potential difference of 200-280 kV, is applied and preferably a current of 2,000 to 7,000 A is set. Preferably the current density in the reaction zone of the electroporation device is 50-450 kA/m$^2$, more preferred 100-200 kA/m$^2$. The electroporation is preferably performed with a pulse frequency from 1 to 30 Hz, more preferred from 15 to 25 Hz, and at a pulse length of the pulsed electric energy of preferably 1-15 μsec, more preferred from 2-6 μsec. Preferably the specific energy input is from 3 to 10 kJ/kg plant material, more preferred from 5-7 kJ/kg plant material.

After the plant material has been subjected to the electroporation, it may be disintegrated in a further process step. This is very easy, since the cut resistance of the biological material will be reduced by the electroporation.

Figure 1:
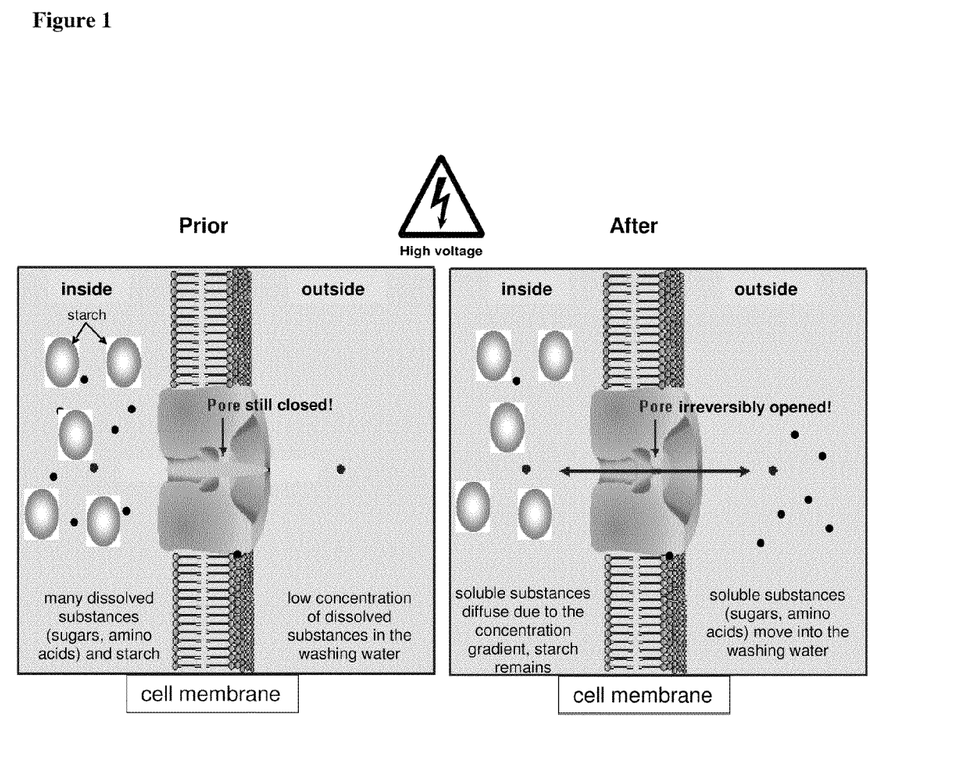
FIG. 1 shows in general form the changes at a cell membrane of a plant subjected to the electroporation and the selective exchange of substances occurring during the process according to the present invention.

In a further process step preferably the cut plant material then can be transported in an aqueous dipping bath, which may comprise salts, or can in several further process steps be successively transported in several dipping baths, for example by being pumped or washed into the dipping bath and the dipping baths, respectively. A concentration gradient between the interior of the cell and the washing water results in the desired selective exchange of substances (see FIG. 1). The cellular liquid with the dissolved substances passes into the washing water. This so much better as higher the concentration gradient is maintained during the course of the wash out procedure. Optimal is a dilution series over two or three dipping baths, which are preferably operated in counterflow mode. However, it has to be noted, that even without using dipping baths an, even though smaller exit of the acrylamide and/or melanoidin forming cellular ingredients occurs. The water temperature in the dipping bath influences the procedure in three ways:

1. The desired diffusion increases with increasing temperature.
2. However, with increasing temperatures also undesired enzymatic degradation processes in the cells increase. Thereby precursors are generated, which may afterwards during the storage result in variances in taste.
3. Furthermore, with increased water temperatures the microbiological contamination of the washing water increases, which has to be avoided necessarily.

The temperature for the respective operation situation has to be determined taking in consideration the mentioned influences and should be between 5° C. and 30° C.

The loss of dry substance during washing is according to the present invention 7% at maximum and is therefore smaller than the loss of dry substance during the blanching process according to the state of the art. Since the loss of dry substance during washing represents a measure for the loss of starch, the loss of starch during the process according to the present invention is smaller than during the conventional blanching process.

In further process steps the biological material can then be further processed to a nibble product, respectively a snack, respectively a potato product. The previous reduction of the acrylamide and/or melanoidin forming substances results in a considerable reduction of the formation of acrylamide (reduced by at least 30%) and/or melanoidins in a frying and drying procedure, respectively, which is necessary therefore.

A further object of the present invention is plant material having a reduced amount of acrylamide and/or melanoidin forming cellular ingredients which is producible by a process according to the present invention.

The plant material may be derived from plants from the family of the Solanaceae. Preferably it is tubers from Solanum tuberosum.

The acrylamide and/or melanoidin forming cellular ingredients are for example at least one substance from the group consisting of asparagine, glucose and fructose.

A further object of the present invention is a nibble product, respectively a snack, respectively a potato product having an acrylamide content being reduced by at least 30% in relation to a nibble product, respectively a snack, respectively a potato product produced from plant material of the same species which previously has not been subjected to the electroporation, which is producible from plant material according to the present invention having a reduced amount of acrylamide forming cellular ingredients. In this connection for example potato chips may be concerned, the acrylamide content of which has been reduced by at least 30% in relation to potato chips which have been produced from the same potato variety.

Figure 2:
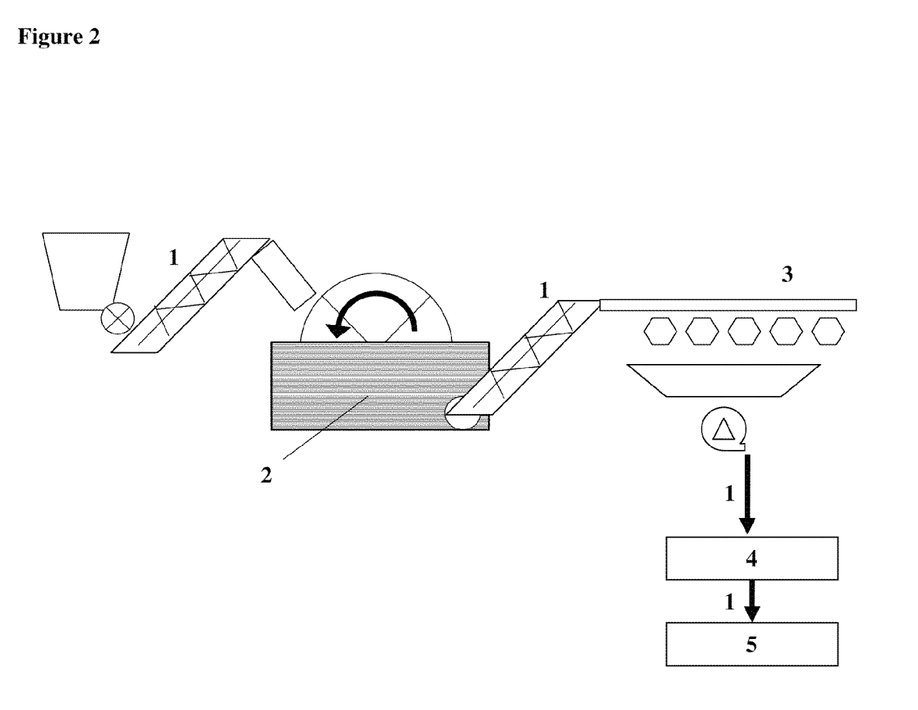
FIG. 2 shows a schematic presentation of an equipment with different devices for the production of a nibble product, respectively a snack, respectively a potato product according to the present invention.

FIG. 2 shows a schematic presentation of a device for producing a nibble product, respectively a snack, respectively a potato product according to the present invention having a reduced content of acrylamide and/or melanoidins, which represents a further object of the present invention, comprising devices for transporting the plant material (1),
an electroporation reactor (2),
a cutting equipment (3),
optionally, at least one dipping bath (4), and optionally
a fryer or a drying device (5).

The following examples will describe the present invention in more detail without limiting the same.

Examples

In all test series the potato variety Lady Rosetta having a dry substance of 22% has been used as raw material. The used potato batch already have had increased sugar values (glucose: 0.078 g/100 g; fructose: 0.0445 g/100 g) due to a longer storage and thus an increased potential for the formation of acrylamide.

The potatoes were sliced by a conventional cutting unit used in the production (Fa. Urschel) in 1.2 mm thick slices promptly in each case. Therefrom for each test run 1,200 g slices were weighed and then that charge was washed in a water bath in a standardised manner. The water bath comprised 24 liters. The water having a temperature was measured exactly for each test and was tempered to ca. 18° C.

For the electroporation the potatoes (invention) were treated as complete tubers in a vertically standing tube filled with water.

Following the tubers were processed in the same manner as the comparative samples.

The weighed 1,200 g slices were washed for 180 sec.

Prior and after the treatment water samples were collected in order to be enable to determine the loss of dry substance subsequently. For this the contents of dry substance of the potatoes were corrected, since the pre-treated slices have released cell water during the processing starting from the time of cutting. This is also the reason for the clear increase of the hardness of the fried chips. This effect of water loss can be used in a continuously production procedure via the control of the holding time outside of the water baths and the transport devices for controlling the dry substance and thus the crispness of the products.

After a quick dewatering of the surface several charges (480 g each) therefrom were fried in a standardised manner to a residual moisture being as comparable as possible at a starting temperature of 185° C.

The finished chips were examined for acrylamide and sensory properties. For the comparison of the crispness (hardness) an in-house 5-point-sensory property-scheme has been used (1=tender; 5=hard).

Analytical Methods:

Dry substance: The determination of the dry matter was carried out by means of surface evaporators and vented heating cabinet at 105° C.
  The part of dissolved dry substance was determined after filtering off the undissolved substance.
Acrylamide: The determination was carried out by means of LCMS:
  HPLC-system from Perkin Elmer series 200
  HPLC column: LichroCART 250-4 Lichrospher CN 5 μm 250 mm×4.6 mm (Merck order number: 1.50892.0001)
  LichroCART 4-4 10 precolumn cartridges Lichrospher 100 CN (5 μm) (Merck order number: 1.50959.0001)
  Eluent: water/acetonitrile 99.5:0.5 v/v with 0.1% (v/v) formic acid (98%) added
  Isocratic, flow 0.250 ml/min
  Chemicals: water HPLC grade from Baker
    acetonitrile for the HPLC Chromanorm from Prolabo
    formic acid 98-100% p.A. (Merck).

MS/MS conditions:
API 2000 from Applied Biosystems, Darmstadt
Mode: multiple reaction monitoring (MRM) in a positive electron spray ionization mode (ESI+)
Qualifier transitions:
Acrylamide m/z 72 to 72 and m/z 72 to 52
Internal standard D3-acrylamide m/z 75 to 75 and m/z 75 to 58
Settings of the TurboIon spray source:
Source temperature: 450° C.
Ion source gas 1: 45.00 psi
Ion source gas 2: 60.00 psi
Collision gas: 3.00 psi
Ion energy IE1: 0.5 V
Ion energy IE3: 1.3 V
Dwell time: 0.25 sec
Resolution Q1: Unit
Resolution Q2: Unit
Hardness: Internal instruction of the company Intersnack Knabbergebäck GmbH & Co. KG
5-point-sensory property-scheme
  The fried chip samples are tasted blindly and have to be brought by the tasters in a ranking on the 5 point scale as regards the bite hardness. Thereby the following scale has to be considered: 1=very tender to 5=very crispy/hard. Any grading in 0.1 steps is allowed.
  The determined values of all tasters are averaged.

TABLE 1

Individual values

| Individual values | Comparative example 1 | Comparative example 2 | Example 1 (Invention) | Example 2 (Invention) | Example 3 (Invention) |
|---|---|---|---|---|---|
| Spec. energy [kJ/kg] | — | — | 8 | 5.5 | 7.5 |
| Corrected dry substance [%] | 22 | 22 | 27 | 27 | 27 |
| Water temperature [° C.] | 18.4 | 16.8 | 17.5 | 17.5 | 17.5 |
| Total dry substance prior [g/l] | 0.385 | 0.385 | 0.385 | 0.385 | 0.385 |
| Total dry substance after [g/l] | 1.35 | 1.89 | 1.125 | 1.295 | 1.395 |
| Soluble dry substance after [g/l] | 0.475 | 0.405 | 0.66 | 0.625 | 0.68 |
| Difference total dry substance [g/l] | 0.965 | 1.505 | 0.74 | 0.91 | 1.01 |
| Difference soluble dry substance [g/l] | 0.09 | 0.02 | 0.275 | 0.24 | 0.295 |
| Difference insoluble dry substance [g/l] | 0.875 | 1.485 | 0.465 | 0.67 | 0.715 |
| Total loss of dry substance based on the initial weight [%] | 8.77 | 13.68 | 5.48 | 6.74 | 7.48 |
| Soluble loss of dry substance based on the initial weight [%] | 0.82 | 0.18 | 2.04 | 1.78 | 2.19 |
| Insoluble loss of dry substance based on the initial weight [%] | 7.95 | 13.50 | 3.44 | 4.96 | 5.30 |
| Acrylamide [μg/kg] | 1380 | 1860 | 810 | 820 | 610 |
| Hardness [scale 1-5] | 2.5 | 2.5 | 5 | 4.7 | 5 |

Considering the mean values the advantages of the process according to the present invention will clearly come in evidence:

TABLE 2

Mean values

| Mean values | Comparative example 1 | Comparative example 2 | Example 1 (Invention) | Example 2 (Invention) | Example 3 (Invention) |
|---|---|---|---|---|---|
| Soluble loss of dry substance based on the initial weight [%] | 0.50 | | | 2.00 | |
| Insoluble loss of dry substance based on the initial weight [%] | 10.73 | | | 4.57 | |

TABLE 2-continued

| Mean values | | | | | |
|---|---|---|---|---|---|
| | Mean values | | | | |
| Mean values | Comparative example 1 | Comparative example 2 | Example 1 (Invention) | Example 2 (Invention) | Example 3 (Invention) |
| Acrylamide [µg/kg] | 1620 | | | 747 | |
| Hardness* [scale 1-5] | 2.5 | | | 4.9 | |

*Test instruction of the company Intersnack Knabbergebäck GmbH & Co. KG

The soluble substances (reaction partners for the Maillard reaction) are washed out by a factor of four as desired and as compared to untreated slices. This results in a reduction of acrylamide of about 53%, which usually can be effected by blanching. But simultaneously the loss of insoluble dry substance (mainly starch) is reduced by 57% as compared to the standard process without blanching.

These results show that the pores of the cell wall (ca. 30-40 nm after treatment) which have been opened by electroporation as used according to the present invention release only dissolved substances, while the much bigger starch grains (ca. 15-100 µm, sometimes also up to 150 µm) remain in the cells.

In contrast, blanching drastically increases the losses of dry substance. Thus, the process according to the present invention does not only avoid the increased losses during blanching, but also results surprisingly to a cost reduction as compared to the standard procedure without blanching. During washing the dry substance now remains largely in the potato, which preserves the resources (potato, fresh water and sewage, energy) and decreases the production costs.

The invention claimed is:

1. Process for removing acrylamide and/or melanoidin forming cellular ingredients from a starchy plant material, comprising the process steps of:
    providing the plant material;
    performing irreversible electroporation of the plant material in an electroporation device; and
    obtaining the plant material having a reduced amount of acrylamide and/or melanoidin forming cellular ingredients, wherein a current of 2,000 A to 7,000 A is set between electrodes of the electroporation device.

2. The process according to claim 1, characterized in that the electroporation is carried out in an electroporation reactor for the continuous processing of lumpy products as process goods in a process liquid with electric pulses, consisting of a circular cylindrical metallic drum having a dielectric coating or being entirely made of dielectric material, which is operable rotating about its horizontally placed cylinder axis/rotational axis at 0.1 to 4 revolutions per min, carriers made of dielectric material at the outer jacket wall of the drum, which are attached thereon distributed uniformly over the circumference, a housing made of dielectric material surrounding with its reactor wall the drum and its carriers in a contact-free but equally spaced manner except for an open area located above the rotational axis, a degasification zone, a reaction zone in the gap between the drum and the reactor wall of the housing, as well as a feeding zone and a discharge zone through which the carriers pass, a process goods supply device which serves as product submission at a constant fill level and which autonomously feeds in the lumpy process goods by the rotational movement of the circular cylindrical drum tangentially in relation to its surface, a discharge zone designed such that a cutout in the cylindrical reactor wall, arranged below the level of the axis of rotation, causes an autonomous discharge of the process goods, the upper edge of the cutout in the cylindrical reactor wall simultaneously serves as effluent weir for the process liquid, the overflowing process liquid is separated from the now processed process goods.

3. The process according to claim 2, characterized in that the electroporation is carried out in an electroporation reactor in which at least one pair of electrodes being a pair of electrodes made of well electroconductive, bare lying material being inert to mechanical and chemical wear is inserted in the lateral walls of the housing of the used electroporation reactor in the area of the reaction zone in the wall of dielectric material, wherein a D.C. voltage being pulsed with a negative or positive potential of up to 300 kV in unipolar mode or +150/−150 kV in bipolar mode is/are connected by connecting at least one unipolar or bipolar electric pulse generator.

4. The process according to claim 1, characterized in that the electroporation is performed in a water bath having a specific conductivity of 0.5-5 mS/cm.

5. The process according to claim 4, characterized in that the water bath has the specific conductivity of 1-2 mS/cm.

6. The process according to claim 1, characterized in that a potential difference of 50-300 kV is applied between the electrodes of the electroporation device.

7. The process according to claim 6, characterized in that the potential difference applied between the electrodes of the electroporation device is of 200-280 kV.

8. The process according to claim 1, characterized in that the current density in the reaction zone of the electroporation device is 50-450 kA/m$^2$.

9. The process according to claim 8, characterized in that the current density in the reaction zone of the electroporation device is 100-200 kA/m$^2$.

10. The process according to claim 1, characterized in that the electroporation is performed with a pulse frequency from 1 to 30 Hz.

11. The process according to claim 10, characterized in that the pulse length of the pulsed electric energy is 1-15 µsec.

12. The process according to claim 10, characterized in that the pulse frequency of the electroporation ranges from 15-25 Hz.

13. The process according to claim 11, characterized in that the pulse length is 2-6 µsec.

14. The process according to claim 1, characterized in that the electroporation is performed at a specific energy input of 3-10 kJ/kg plant material.

15. The process according to claim 14, characterized in that the specific energy input of the electroporation is 5-7 kJ/kg plant material.

16. The process according to claim 1, wherein the acrylamide and/or melanoidin forming cellular ingredients are substances selected from the group consisting of asparagine, glucose and fructose.

17. The process according to claim 1, wherein the plant material is of plants from the family of the Solanaceae.

18. The process according to claim 17, wherein the plant material is root tubers from *Solanum tuberosum*.

19. The process according to claim 1, further comprising disintegrating the plant material.

20. The process according to claim 1, further comprising washing the plant material, wherein the plant material is transported in at least one or more dipping baths and is washed therein, wherein the at least one dipping bath is operated in counter flow mode, and wherein the loss of dry substance occurring during the washing of the plant material in the dipping baths is 7 wt. % or less.

21. The process according to claim 20, characterized in that the temperature of the dipping baths is set independently from each other in the range of 5° C. to 30° C.

22. The process according to claim 1, further comprising further processing of the plant material to a nibble product, a snack, or, if the plant material is root tubers from *Solanum tuberosum*, to a potato product.

* * * * *

(12) EX PARTE REEXAMINATION CERTIFICATE (10711th)
United States Patent
Ulrich et al.

(10) Number: US 8,206,767 C1
(45) Certificate Issued: Sep. 18, 2015

(54) REMOVAL OF ACRYLAMIDE AND/OR MELANOIDIN-FORMING CELL CONTENT

(75) Inventors: Bernhard Ulrich, Grevenbroich (DE); Reiner Haferkamp, Grevenbroich (DE); Martin Kern, Waghäusel (DE)

(73) Assignee: INTERSNACK KNABBERGEBACK GMBH & CO. KG, Cologne (DE)

Reexamination Request:
No. 90/013,366, Oct. 9, 2014

Reexamination Certificate for:
Patent No.: 8,206,767
Issued: Jun. 26, 2012
Appl. No.: 12/594,330
PCT Filed: Mar. 5, 2008
PCT No.: PCT/EP2008/001759
§ 371 (c)(1),
(2), (4) Date: Oct. 1, 2009
PCT Pub. No.: WO2008/122333
PCT Pub. Date: Oct. 16, 2008

(30) Foreign Application Priority Data

Apr. 5, 2007 (EP) .................................... 07007219

(51) Int. Cl.
*A23L 1/015* (2006.01)
*A23L 1/025* (2006.01)
*A23L 1/217* (2006.01)

(52) U.S. Cl.
CPC ................. *A23L 1/015* (2013.01); *A23L 1/025* (2013.01); *A23L 1/217* (2013.01)

(58) Field of Classification Search
None
See application file for complete search history.

(56) References Cited

To view the complete listing of prior art documents cited during the proceeding for Reexamination Control Number 90/013,366, please refer to the USPTO's public Patent Application Information Retrieval (PAIR) system under the Display References tab.

*Primary Examiner* — Evelyn Huang (57) ABSTRACT

The present invention relates to a process for removing acrylamide and/or melanoidin forming cellular ingredients from starchy plant material without enabling to remove a considerable amount of starch from the cells by washing, comprising the process steps of: providing the biological material, irreversible electroporation of the biological material, and obtaining plant material having a reduced amount of acrylamide and/or melanoidin forming cellular ingredients, the starch content of which is not enabled to be considerably reduced by washing as compared to the starting material. Furthermore, the present invention relates to plant material having a reduced of amount of acrylamide and/or melanoidin forming cellular ingredients producible by said process, to a nibble product, respectively a snack having a reduced content of acrylamide and/or melanoidins producible from said plant material, and to a device for producing the nibble product, respectively the snack comprising an electroporation reactor, a cutting equipment, optionally at least one dipping bath and a fryer or a drying device.

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-22 is confirmed.

New claims 23-27 are added and determined to be patentable.

*23. The process according to claim 1, wherein the specific energy input of the electroporation is greater than 5 kJ/kg plant material and not greater than 10 kJ/kg plant material.*

*24. The process according to claim 1, wherein the specific energy input of the electroporation is 5.5-10 kJ/kg plant material.*

*25. The process according to claim 1, wherein the specific energy input of the electroporation is 5.5-8 kJ/kg plant material.*

*26. The process according to claim 1, wherein the specific energy input of the electroporation is 7.5-10 kJ/kg plant material.*

*27. The process according to claim 1, wherein the specific energy input of the electroporation is 7.5-8 kJ/kg plant material.*

\* \* \* \* \*